(12) United States Patent
Vermeire et al.

(10) Patent No.: US 8,262,002 B2
(45) Date of Patent: Sep. 11, 2012

(54) PRESSURE SWIRL ATOMIZING NOZZLE FOR SPRAYING A CURABLE COMPOSITION AND ASSOCIATED METHOD AND USE

(75) Inventors: Christophe Vermeire, Gentbrugge (BE); Kristof Benoit, Waregem (BE)

(73) Assignee: Recticel Automobilsysteme GmbH, Rheinbreitbach (DE)

( * ) Notice: Subject to any disclaimer, the term of this patent is extended or adjusted under 35 U.S.C. 154(b) by 454 days.

(21) Appl. No.: 12/602,944

(22) PCT Filed: Jun. 4, 2007

(86) PCT No.: PCT/EP2007/055478
§ 371 (c)(1),
(2), (4) Date: Dec. 3, 2009

(87) PCT Pub. No.: WO2008/148419
PCT Pub. Date: Dec. 11, 2008

(65) Prior Publication Data
US 2010/0178428 A1     Jul. 15, 2010

(51) Int. Cl.
*B05B 17/04*     (2006.01)
(52) U.S. Cl. .......... 239/11; 239/463; 239/468; 239/492; 239/493; 239/497
(58) Field of Classification Search .............. 239/11, 239/463, 468, 467, 491, 492, 493, 497
See application file for complete search history.

(56) References Cited

U.S. PATENT DOCUMENTS

| | | | |
|---|---|---|---|
| 3,116,879 A | 1/1964 | Wagner | |
| 3,680,793 A * | 8/1972 | Tate et al. | 239/468 |
| 4,125,226 A * | 11/1978 | Nieuwkamp | 239/468 |
| 5,067,655 A | 11/1991 | Farago et al. | |
| 7,611,079 B2 * | 11/2009 | Whittaker et al. | 239/463 |

FOREIGN PATENT DOCUMENTS

| | | |
|---|---|---|
| DE | 2531969 A1 | 3/1977 |
| WO | 89/05195 A1 | 6/1989 |
| WO | 2004/076072 A1 | 9/2004 |

* cited by examiner

*Primary Examiner* — Steven J Ganey
(74) *Attorney, Agent, or Firm* — Sughrue Mion, PLLC (57) ABSTRACT

The pressure swirl atomizing nozzle for spraying a curable composition comprises an orifice piece (16), which defines a funnel-shaped cavity and an exit orifice (17), and an injector piece (18) which closing off the funnel-shaped cavity so that the funnel-shaped cavity forms a swirl chamber (19) between a front side of the injector piece (18) and the exit orifice (17). The injector piece (18) comprises at least two swirl ports (20) which end in the swirl chamber (19) for injecting the curable composition therein and for thereby imparting swirl to the curable composition. Compared to the sum of the smallest cross-sectional areas of the swirl ports (20), the side wall (24) of the swirl chamber (19) has a relatively small surface area which is however still large enough to distribute the curable composition so as to achieve a uniform spray pattern. By the reduced size of the swirl chamber (19), the curable composition can be atomized more efficiently. In this way, changes of the relatively low flow rate of the curable composition through the nozzle have less effect on the droplet size and on the stability of the spray pattern.

25 Claims, 4 Drawing Sheets

PRESSURE SWIRL ATOMIZING NOZZLE FOR SPRAYING A CURABLE COMPOSITION AND ASSOCIATED METHOD AND USE

The present invention relates to a pressure swirl atomizing nozzle as defined in the preamble of claim 1 for spraying a curable composition onto a surface to produce a polymeric layer thereon. The invention also relates to a method for spraying the curable composition onto a surface, in which method use is made of the nozzle according to the invention.

The curable composition is in particular a polyurethane reaction mixture which is sprayed onto a mould surface to produce for example interior trim parts or panels for automobiles such as dashboards, door panels, glove compartment covers, consoles, etc. Such polyurethane reaction mixtures usually have a relatively high viscosity and hence are quite difficult to atomize.

A pressure swirl atomizing nozzle for spraying a layer of a polyurethane reaction mixture onto a mould surface as defined in the preamble of claim 1 is already disclosed in EP-B-0 303 305 and EP-B-0 389 014. The nozzles disclosed in these patents comprise an orifice piece that defines a funnel-shaped cavity ending in the exit orifice of the nozzle. At its upstream extremity, the funnel-shaped cavity is closed off by an injector piece so that a swirl chamber is formed between the front side of the injector piece and the exit orifice. The injector piece comprises two or more swirl ports through which the curable composition is injected into the swirl chamber. Due to the obtained swirling motion, the curable composition is sprayed out of the exit orifice in the form of a hollow spray cone.

When using the nozzles disclosed in these prior art patents for spraying a layer of a curable composition onto complex mould surfaces, in particular onto mould surfaces which show cavities, the nozzles should be made quite small so that they can be moved within narrow cavities whilst maintaining a sufficient spray distance. Moreover, the flow rate of the curable composition should be quite low so that, even when spraying from a short distance, a thin layer of curable composition can be applied uniformly onto the mould surface. The curable composition may further not be atomized into a too fine mist to avoid overspray.

When spraying the curable composition onto mould surfaces, it is desirable to vary the flow rate of the curable composition without influencing the spray pattern (droplet size, stability of the spray pattern, i.e. the kinetic energy of the curable composition) too much. This would allow to reduce the flow rate of the curable composition when spraying from a short spray distance, for example at the edges or in narrow cavities, and to increase the flow rate of the curable composition when spraying from a greater spray distance, onto a larger surface. In this way, it is possible to spray a layer having a more uniform thickness and to reduce overspray without increasing the cycle time too much.

Tests performed by the present inventors with nozzles as disclosed in EP-B-0 303 305 and EP-B-0 389 014 have shown that when spraying a polyurethane reaction mixture at such a pressure that it is atomized into droplets having an MVD of about 95 μm, a reduction of the applied pressure by 40% resulted in a decrease of the flow rate by about 30% and in an increase of the MVD of the sprayed droplets by about 65% (MVD is the medium volume diameter of the droplets as determined in accordance with ASTM E 799-81). This increase of the droplet size is much higher than observed for example when atomizing fuel oils. According to the article "Fuel Nozzles for Oil Burners" by E. O. Olson (Delavan), research has shown that the median droplet size varies inversely as the 0.3 power of the pressure change. A pressure reduction of 40% would thus correspond to an increase of the droplet size by about 16%, which is much smaller than the droplet size increase observed in practice for polyurethane reaction mixtures.

A first drawback of the larger droplet size is that bigger air bubbles will be included in the sprayed layer leading to worse mechanical properties. A further drawback is that a spray pattern formed by larger droplets is less stable and will be more easily disturbed by gravity or air currents, so that a thicker layer will need to be sprayed to obtain a uniform layer with the desired mechanical properties.

In practice there exist already so-called variable flow nozzles, such as bypass or return flow nozzles, air atomizing nozzles, dual orifice type nozzles and duplex nozzles. These nozzles enable a larger variation of the flow rate through the nozzle but are not suited at all for spraying curable compositions. Moreover, they are relatively voluminous.

A nozzle which is suitable for spraying a polyurethane reaction mixture at a variable flow rate is disclosed in WO-A-2005/000481. In order to enable to vary the flow rate of the reaction mixture, an amount of a pressurized gas is added thereto. In this way, due to the volume of gas, the flow rate of the polyurethane reaction mixture can be reduced and it can be varied by varying at the same time also the amount of pressurized gas added thereto. The spray equipment related to this gas-assisted spray process is however more complex and expensive.

An object of a first aspect of the present invention is to provide a new pressure swirl nozzle which enables to spray the curable composition at a relatively low flow rate so that relatively coarse droplets are produced and which enables to reduce the effect of a variation of this relatively low flow rate on the size of the sprayed droplets.

To this end, the nozzle according to the first aspect of the invention is characterised in that the injector piece is situated at such a distance from the exit orifice that $$6 \leq \frac{A_{sc} * \cos\beta}{A_{sp,tot}} \leq 17$$

and in that
the ratio $L_o/D_o$ is smaller than 1, with
  $A_{sc}$=the surface area, in mm², of the side wall of the swirl chamber;
  β=the inclination angle of the swirl ports;
  $A_{sp,tot}$=the sum of the smallest cross-sectional areas $A_{sp}$, in mm², of the swirl ports measured in a cross-sectional plane perpendicular to the predetermined overall direction wherein the curable composition is injected through the respective swirl port in the swirl chamber;
  $L_o$=the length of the exit orifice, in mm;
  $D_o$=the diameter of the exit orifice, in mm; and
  ≦=smaller or equal to.

It has been found that when positioning the injector piece closer to the exit orifice, i.e. when reducing the surface area $A_{sc}$ of the side wall of the swirl chamber, a decrease of the flow rate has a smaller effect on the droplet size. The surface area $A_{sc}$ should more particularly be so small that $$\frac{A_{sc} * \cos\beta}{A_{sp,tot}} \leq 17,$$

preferably ≦15, more preferably ≦13 and most preferably ≦12.

The ratio $$\frac{A_{sc} * \cos\beta}{A_{sp,tot}}$$

can also be reduced by increasing the cross-sectional surface area $A_{sp,tot}$ of the swirl ports. However, this will result in higher flow rates. Since the nozzle according to the invention is intended for spraying at relatively small flow rates, the sum $A_{sp,tot}$ of the smallest cross-sectional areas $A_p$ of the swirl ports has to be smaller than 0.9 mm² and preferably even smaller than 0.6 mm².

The surface area $A_{sc}$ of the side wall of the swirl chamber cannot be reduced unlimitedly. Indeed, a minimum surface area is required to be able to obtain a uniform spray pattern. In this respect, it been found that the ratio $$\frac{A_{sc} * \cos\beta}{A_{sp,tot}}$$

should be greater than or equal to 6, preferably ≦7, more preferably ≦8 and most preferably ≦8.5.

To reduce the effect of the flow rate on the droplet size, the ratio $L_o/D_o$ should finally be smaller than 1, preferably smaller than 0.6, more preferably smaller than 0.5 and most preferably smaller than 0.4.

In a preferred embodiment of the nozzle according to the invention, the smallest cross-sectional area of each of said swirl ports, measured in a cross-sectional plane perpendicular to the predetermined overall direction wherein the curable composition is injected by the swirl port into the swirl chamber, is greater than 0.07 $mm^2$, preferably greater than 0.08 $mm^2$, but smaller than 0.25 $mm^2$, preferably smaller than 0.20 $mm^2$ and more preferably smaller than 0.15 $mm^2$.

In order to reduce the risk of clogging of the swirl ports, for example by bits of (partially) cured curable composition, the cross-sectional area of each of the swirl ports should be large enough. However, the smaller the cross-sectional area of each of the swirl ports, the more swirl ports can be provided and the more evenly the curable composition is distributed over the side wall of the swirl chamber. This is important in view of being able to obtain a uniform spray pattern wherein the curable composition is evenly distributed.

In a further aspect of the invention, when projected at right angles onto a further longitudinal plane comprising said longitudinal axis and a straight line which intersects said longitudinal axis perpendicularly and which passes through the centre of the outlet of the respective swirl port, the predetermined overall directions wherein the curable composition is injected out of the swirl ports into the swirl chamber form an angle $\gamma$ with said transverse plane B perpendicular to said longitudinal axis which is at least 8°, preferably at least 12° larger than the average angle $\alpha_{av}$ formed by the side wall of the swirl chamber with said transverse plane B.

Due to the fact that the curable composition is injected under an angle against the side wall of the swirl chamber, an improved uniformity of the spray pattern is obtained.

The present invention also relates to a method for producing a polymeric layer on a surface by spraying a curable composition thereon by means of a pressure swirl atomizing nozzle. This method is characterised in that use is made of a pressure swirl atomizing nozzle according to the invention.

Other particularities and advantages of the invention will become apparent from the following description of some particular embodiments of the nozzle and of the method according to the present invention. The reference numerals used in this description relate to the annexed drawings wherein:

FIG. 1 is a schematic diagram showing the principle of spraying a polyurethane reaction mixture onto a mould surface with a nozzle according to the present invention;

FIG. 2 shows a schematic side view of a spray pattern which can be achieved by a nozzle according to the present invention, the reaction mixture being sprayed in the form of a hollow cone;

FIG. 3 is a cross-sectional view through a nozzle according to the present invention;

FIG. 4 is a top plan view on the nozzle shown in FIG. 3;

FIG. 5 is a top plan view on the injector piece of the nozzle shown in FIGS. 3 and 4;

FIG. 6 is a side view on the injector piece shown in FIG. 5;

FIG. 7 is, on a larger scale, a cross-sectional view through the orifice piece and the injector piece of the nozzle illustrated in FIG. 3; and FIGS. 8 and 9 are similar to FIG. 7 but show variant embodiments.

The present invention relates to a pressure swirl atomizing nozzle, and to a method for spraying method a curable composition by means of this nozzle onto a surface to produce a polymeric layer thereon. The nozzle is a so-called airless spray nozzle, i.e. a nozzle wherein no gas is added in order to influence the spray pattern. The curable composition is in particular a reactive mixture of components producing polyurethane, called herein a polyurethane reaction mixture. The curable composition may optionally contain a physical or chemical blowing agent which provides for a foaming of the layer of curable composition deposited on the surface. Although other curable compositions such as silicone resins, epoxy resins and phenolic resins can also be sprayed, the further detailed description will be made with reference to the spraying of polyurethane reaction mixtures. Such mixtures are usually obtained by mixing two components, namely an isocyanate component and a polyol component, although it is possible to use more than two component streams. The sprayed polyurethane reaction mixture preferably comprises no solvents (including water), or only a small amount of solvents, in particular less than 10% by weight, more particularly less than 5% by weight, so that the reaction mixture, when being sprayed, has a relatively high viscosity.

The sprayed polyurethane layer has usually an average density higher than 300 g/l, preferably higher than 400 g/l and most preferably higher than 600 g/l. The polyurethane layer may be a rigid polyurethane layer but it is preferably a flexible elastomeric polyurethane layer, in particular a so-called polyurethane skin having preferably an average thickness (determined by dividing the volume of the skin by its surface area) in the range of 0.1 to 3 mm, preferably 0.3 to 2 mm. In practice, especially in order to produce an interior trim part for automotive vehicles such as a dash board, a door panel, a console, etc., a rigid backing layer is applied behind such skin layer and, between both layers preferably an intermediate foam layer.

Reaction mixtures for spraying a polyurethane skin are disclosed for example in EP-B-0 379 246. These reaction mixtures are composed by mixing an isocyanate component and a polyol component just before spraying the reaction mixture. The isocyanate component may be based on aliphatic isocyanates in order to achieve a light-stable polyurethane skin. In practice, it is however also possible to spray a polyurethane skin which is not light-stable. In the reaction mixture for such skins, use is made of more reactive aromatic polyisocyanates. In this case a paint layer is preferably applied onto such skins either after having produced the skin or by applying the paint layer onto the mould surface as an in-mould coating before spraying the reaction mixture for the skin onto the mould surface, in order to render the skins light-stable.

Figure 1:
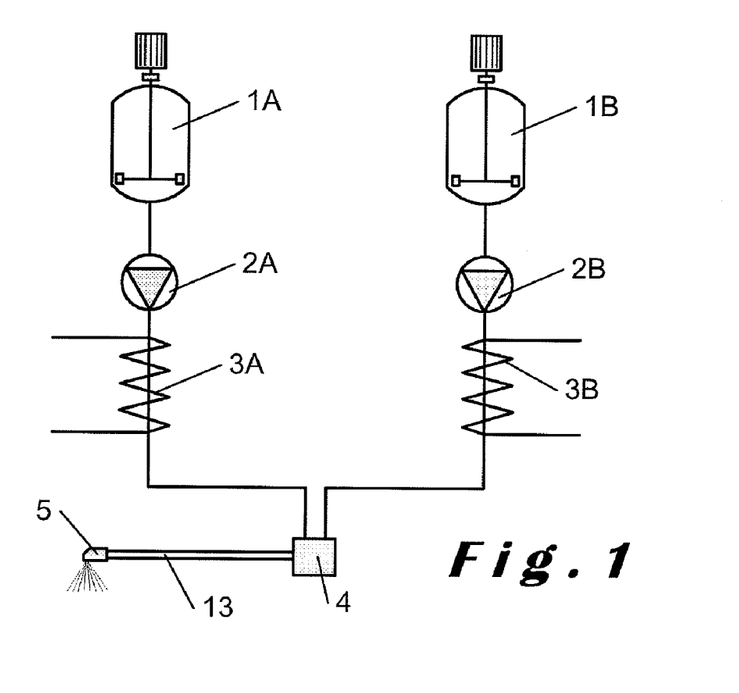

The basic principle for spraying the polyurethane reaction mixture is illustrated in FIG. 1.

In a first step, the two components, namely the polyol and the isocyanate component, are dosed from stirrer tanks 1A and 1B by means of pumps 2A and 2B and are heated to the desired temperature in heat exchangers 3A and 3B before being mixed in a movable spray gun 4, provided with a spray nozzle 5. From this spray nozzle 5 the reaction mixture is sprayed according to a predetermined spray pattern onto a surface, in particular a mould surface 6. After having cured the reaction mixture, the formed polyurethane layer 9 can be removed from the mould surface 6, optionally after having applied one or more additional layers onto the back of the sprayed polyurethane layer 9. The polyurethane layer does not necessarily have to be sprayed onto a mould surface but can also be sprayed against another layer of the moulded article which is to be produced, for example against an in-mould coating layer or against an outer skin layer which has already been sprayed onto the mould surface and which may also be a polyurethane layer. This outer polyurethane layer can also be sprayed by means of a nozzle according to the invention and may for example be an aliphatic layer whilst the inner layer is an aromatic polyurethane layer. The inner layer may have a same density as the outer layer but it can also have a lower density.

When spraying the viscous reaction mixture out of the nozzle 5, the obtained spray pattern usually consists of a film 7 which falls apart into droplets 8 after a certain distance d of for example 0.5 to 20 cm. The spray process is preferably controlled in such a manner that this reaction mixture is sprayed out of the nozzle either directly in the form of droplets 8 which have a medium volume diameter (MVD), determined according to ASTM E 799-81, larger than 50 µm, preferably larger than 60 µm, more preferably larger than 70 µm and most preferably larger than 80 µm, or in the form of a film 7 which falls apart into such droplets 8 at a distance d from the nozzle 5. The spray process is further preferably controlled in such a manner that the droplets 8 have a medium volume diameter smaller than 500 µm, preferably smaller than 300 µm, more preferably smaller than 200 µm and most preferably smaller than 150 µm. When spraying in narrow cavities, it is possible that the distance between the nozzle and the mould surface, i.e. the spray distance D, is smaller than the distance d after which the film falls apart into droplets so that the reaction mixture arrives onto the mould surface 6 in the form of the film 7.

Figure 2:
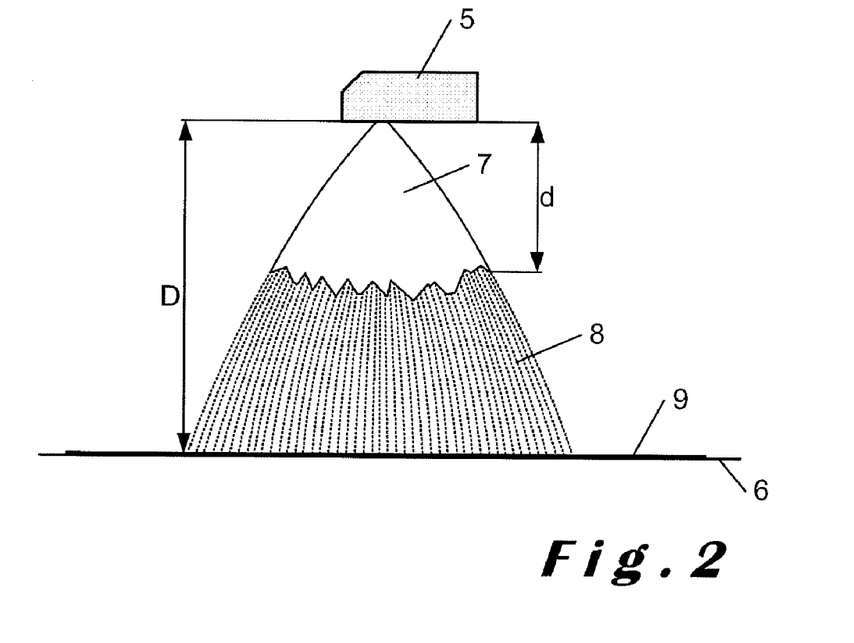

The reaction mixture is sprayed in the shape of a round or elliptical cone which is preferably hollow. A hollow cone shaped spray pattern has been illustrated in FIG. 2 and is preferred in view of the fact that it enables to achieve a more uniform layer thickness.

The polyurethane layer is preferably sprayed onto the mould surface in two or more phases. In a first phase, the polyurethane reaction mixture is preferably sprayed at a higher flow rate, usually from a greater spray distance D. In a next phase, the flow rate is preferably reduced so that the spray distance D can be decreased to spray more complexly shaped portions of the mould surface or to spray the edges thereof. In this way it is possible to achieve a more uniform layer thickness and to reduce overspray. The ratio between the highest and the lowest flow rate applied when spraying the polyurethane layer is preferably $\geq 1.1$, in particular $\geq 1.2$, and more in particular $\geq 1.3$.

As explained hereabove, the curable composition is composed by mixing at least two components, in particular a polyol and an isocyanate component, in a predetermined ratio. During the transition from one flow rate to another flow rate the operation of the pumps 2A and 2B is preferably controlled in such a manner that the ratio between the reaction components is preferably also maintained constant when varying the flow rate. In this way, it is not necessary to interrupt spraying of the polymeric layer when switching from one flow rate to another. This offers the advantage that no material is lost during the switching between the different flow rates. When spraying the skin of a common instrument panel, a material saving of about 10% can be achieved whilst the spray time was only increased with about 5%.

When lowering the flow rate, it is desirable that the droplet size does not become too large to avoid that too big air enclosures would be incorporated in the sprayed layer and to prevent an unstable spray pattern. On the other hand, when increasing the flow rate, it is desirable that the droplet size does not become too small to avoid a too fine mist. Both when spraying at the highest and at the lowest flow rate, the medium volume diameter of the produced droplets should preferably be within the ranges described hereabove.

According to the present invention, a new nozzle is provided which enables to vary the flow rate of the curable composition through the nozzle with a reduced effect on the droplet size.

Figure 3:
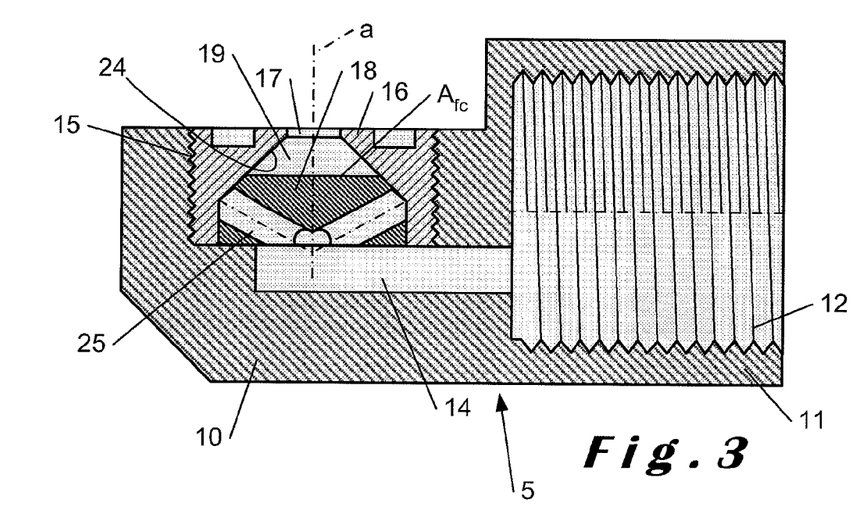
Figure 4:
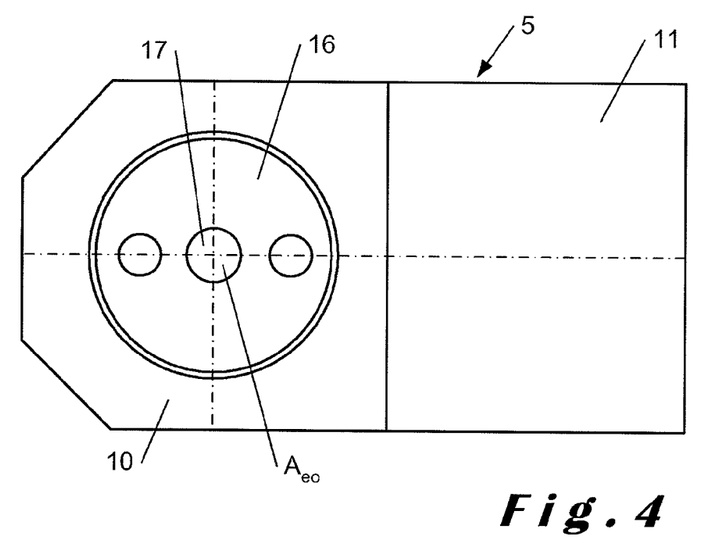

FIG. 3 illustrates a first embodiment of a pressure swirl atomizing nozzle according to the present invention. This spray nozzle 5 comprises a housing 10 having a tubular end 11 provided with an internal screw thread 12 by means of which it can be screwed onto the distal end of a static mixer 13 of the spray gun 4. The housing 10 is further provided with a longitudinal bore 14, forming a supply channel ending in a larger, transverse bore 15 which has an open end. The inner surface of the transverse bore 15 is screw threaded and an orifice piece 16, provided with a corresponding screw thread, is screwed into this bore 15.

The orifice piece 16 is a hollow piece which is open at the bottom and which defines a funnel-shaped cavity and, at its top, an exit orifice 17. The funnel-shaped cavity has a longitudinal axis a passing through the centre of the exit orifice 17. An injector piece 18 is inserted through its open bottom into the orifice piece 17 to close off this funnel-shaped cavity at its upstream extremity. In this way, the funnel-shaped cavity forms a swirl chamber 19 between the front side of the injector piece 18 and the exit orifice 17.

In the embodiment illustrated in the figures, the side wall 24 of the swirl chamber 19, i.e. the inner surface of the funnel-shaped cavity, is conical and forms in longitudinal sections through the longitudinal axis a of the funnel-shaped cavity an angle $\alpha$, which is generally comprised between 30 and 60°, with a transverse plane B perpendicular to this longitudinal axis a. If the angle $\alpha$ is not constant, for example due to the fact that the side wall is curved when seen in said longitudinal sections, the average angle $\alpha_{av}$ should be comprised between 30 and 60°, the average angle $\alpha_{av}$ being a surface-weighted average taking into account the surface area of the side wall showing a same angle $\alpha$. In the embodiment illustrated in FIG. 8, a first portion 24' of the side wall 24, situated adjacent the injector piece 18, forms an angle $\alpha'$ with the transverse plane B whilst a second portion 24" of the side wall 24, situated adjacent the exit orifice 17, forms an angle $\alpha'$ with this transverse plane B. When the first portion 24' has a surface area $A_1$ and the second portion 24" a surface area $A_2$, $\alpha_{av}$ is equal to $$\frac{A_1^* \alpha' + A_2^* \alpha''}{A_1 + A_2}.$$

Figure 9:
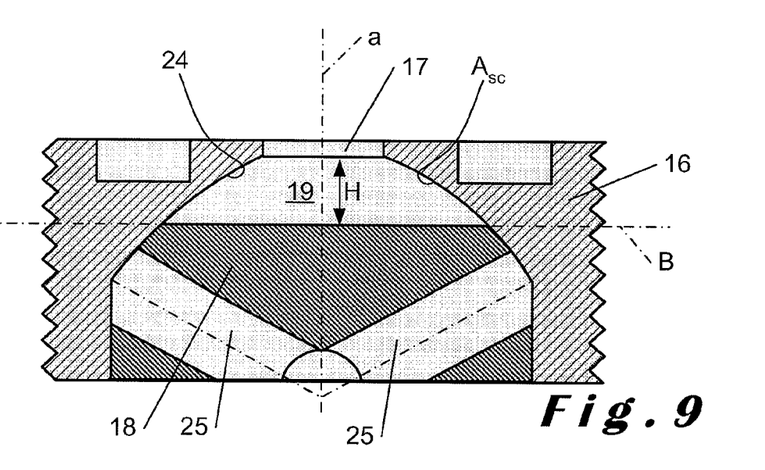

For a curved side wall 24, as illustrated in FIG. 9, the average angle $\alpha_{av}$ can be calculated in a similar way.

Figure 5:
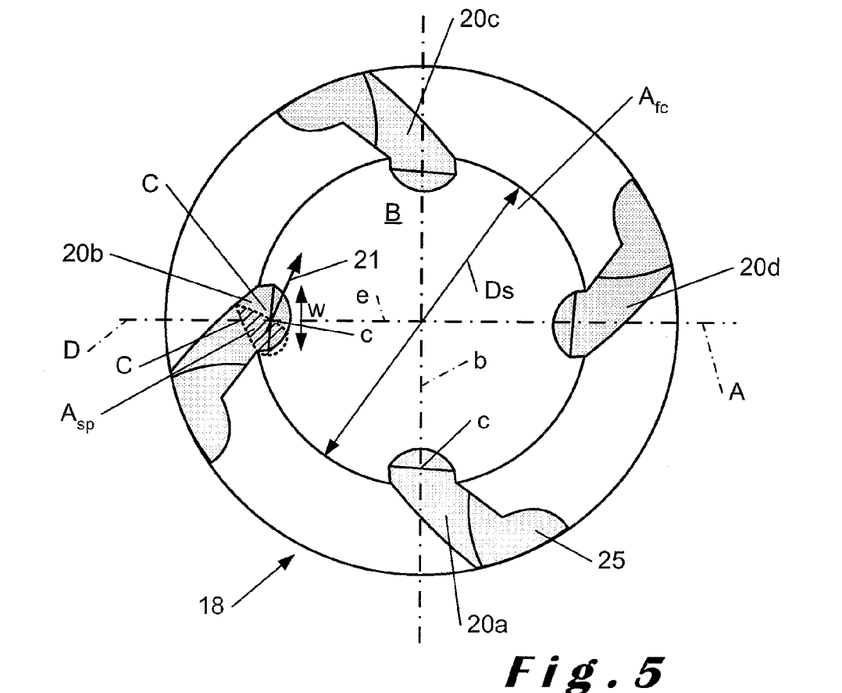
Figure 6:
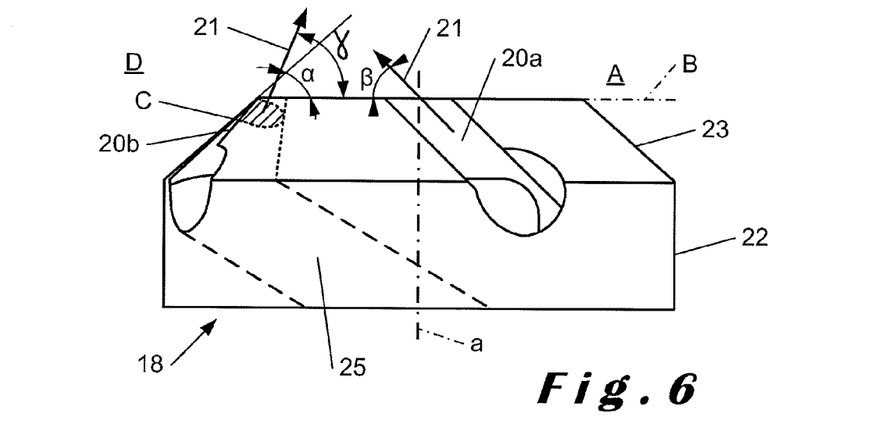

The injector piece 18 comprises four swirl ports 20 (i.e. 20a, 20b, 20c and 20d), through which the reaction mixture, which is supplied through the longitudinal bore 14, is injected into the swirl chamber 19 according to a predetermined overall direction, indicated by the general speed vectors 21. As illustrated in FIGS. 5 and 6 the injector piece 18 consists for example of a cylindrical portion 22 and a frustoconical portion 23 fitting within the hollow orifice piece 16, the frustoconical portion 23 fitting more particularly against the conical inner surface of the orifice piece 16. In the frustoconical upper surface four grooves are made forming the swirl ports 20. Each of these grooves or swirl ports 20 is connected by a cylindrical boring 25, which ends centrally in the bottom side of the injector piece 18, to the supply channel 14 so that the flow of reaction mixture is split over the four borings 25 and swirl ports 20.

The swirl ports 20 are oriented so that the predetermined overall direction 21 wherein the reaction mixture is injected in the swirl chamber 19 forms, when projected at right angles onto a longitudinal plane A comprising the longitudinal axis a of the funnel-shaped cavity and being perpendicular to a straight line b which intersects said longitudinal axis a perpendicularly and which passes through the centre c of the outlet of the respective swirl port 20, an angle $\beta$ with a transverse plane B perpendicular to said longitudinal axis a, the angle $\beta$ being comprised between 30 and 60°. Since in the representation of FIG. 6 the angle $\beta$ can be seen for the swirl port 20a, the longitudinal plane A, the centre c and the straight line b used for determining the angle $\beta$ have been illustrated in FIGS. 5 and 6 for this swirl port 20a.

The swirl ports 20 preferably have a cross-sectional area, measured in a cross-sectional plane C (illustrated for swirl port 20b) perpendicular to the predetermined overall direction 21 wherein the reaction mixture is injected by the respective swirl port 20 in the swirl chamber 20, which is not constant but which decreases towards the swirl chamber 20. In this way the pressure drop over the nozzle is reduced. In the embodiment illustrated in FIGS. 5 and 6, the decreasing cross-sectional area of the grooves is achieved by the fact that the depth of the swirl ports 20, measured perpendicular to the side wall of the funnel-shaped cavity, decreases towards the swirl chamber 19. Due to the fact that the cross-sectional area of the swirl ports 20 is not constant, the direction of flow of the reaction mixture differs over the cross-section of the swirl ports 20 so that the predetermined overall direction 21 wherein the reaction mixture is injected in the swirl chamber 19 corresponds to the general speed vector of the reaction mixture leaving the swirl port 20 (the general speed vector is determined assuming a uniform speed magnitude of the reaction mixture across the entire cross-section of the swirl port).

The depth of the swirl ports 20 decreases to such an extent towards the swirl chamber 19 that the predetermined overall direction 21 wherein the reaction mixture is injected in the swirl chamber 19 forms an angle $\gamma$ with said transverse plane B, perpendicular to the longitudinal axis a of the swirl chamber 19, which is larger than the angle $\alpha$ or the average angle $\alpha_{av}$ formed between the side wall 24 of the swirl chamber 19 and the transverse plane B. The angle $\gamma$ can be seen for swirl port 20b in FIG. 6. To determine this angle $\gamma$ for swirl port 20b, the predetermined overall direction 21 is projected at right angles onto a further longitudinal plane D (which is the same as the plane A used for determining the inclination angle $\beta$ of the swirl port 20a) which comprises again the longitudinal axis a of the funnel-shaped cavity and a straight line e which intersects said longitudinal axis a perpendicularly and which passes through the centre c of the swirl port 20b. The angle $\gamma$ is then determined as the angle between this projection of the overall direction 21 and the transverse plane B. The angle $\gamma$ is preferably at least 8°, more preferably at least 12° larger than the average angle $\alpha_{av}$ (which is equal to the angle $\alpha$ when this angle is constant). In this way, the reaction mixture is injected under an angle against the side wall 24 of the swirl chamber 19 so that the reaction mixture is already better spread in the swirl chamber.

Figure 7:
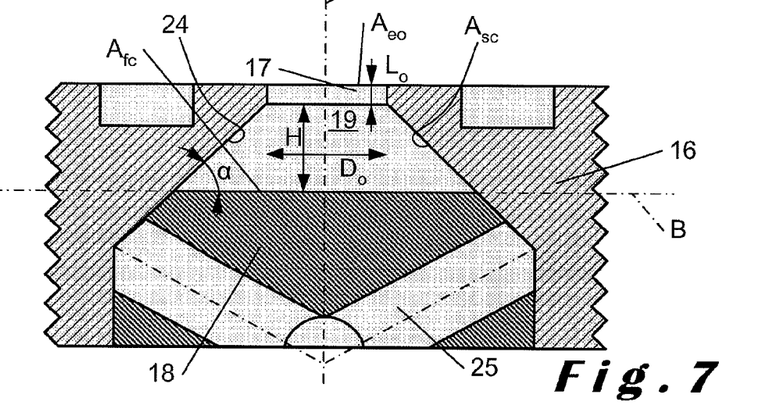
Figure 8:
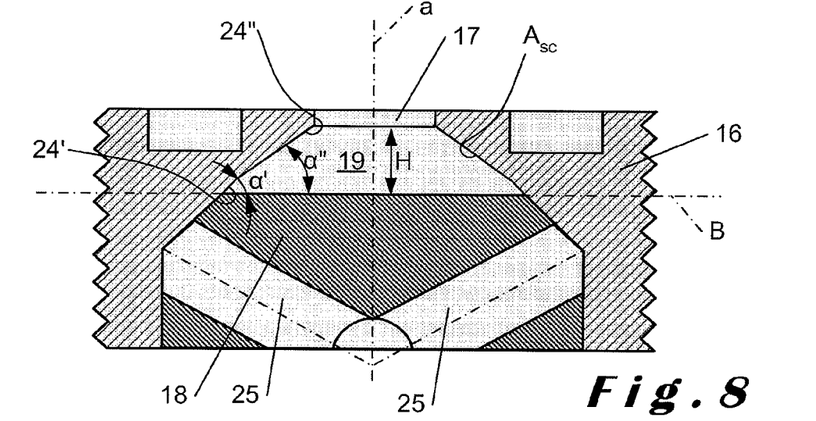

In the embodiments illustrated in FIGS. 8 and 9, the difference between the angles $\alpha_{av}$ and $\gamma$ is achieved (or increased) by shaping the funnel-shaped cavity in such a manner that the angle $\alpha$ decreases towards the exit orifice 17. The angle $\alpha$ can either decrease in a discontinuous way, as illustrated in FIG. 8, or in a continuous way, as illustrated in FIG. 9. In the example of FIG. 9, not only the side wall 24 is curved but also the frustoconical portion 23 of the injector piece 18 which fits against the conical inner surface of the orifice piece 16. Alternatively, it is also possible to maintain the straight injector piece 18 illustrated in FIGS. 7 and 8 and to curve only the side wall 24 of the swirl chamber 19.

In a further embodiment, not illustrated in the figures, the swirl ports 20 could also be formed by borings instead of by grooves. In this way, the angle $\gamma$ can be controlled by selecting the direction of these borings.

The nozzle according to the invention comprises at least two, but preferably at least three, more preferably at least four swirl ports 20. More swirl ports 20 enable to achieve a better distribution of the reaction mixture in the swirl chamber, i.e. a more uniform spray pattern but, for a same total flow rate, the more swirl ports 20, the smaller should be the smallest cross-sectional area $A_{sp}$ of each of the swirl ports 20. A better distribution of the reaction mixture in the swirl chamber can also be achieved by increasing the width of the swirl ports (and correspondingly decreasing the depth thereof). In a preferred embodiment, the swirl ports 20 have therefore at their outlet a width w, measured in a transverse plane B perpendicular to said longitudinal axis a, in a direction tangent to the outer circumference of the front side of the injector piece 18, the sum of the widths w of the swirl ports 20 being at least 11%, more preferably at least 14% and most preferably at least 17% of the outer circumference of the front side of the injector piece 18.

The nozzle according to the present invention is a small nozzle intended to spray at relatively low flow rates. The swirl ports 20 are so small that the sum $A_{sp,tot}$ of their smallest cross-sectional areas $A_{sp}$, measured each in a cross-sectional plane C (illustrated for swirl port 20b) perpendicular to the predetermined overall direction 21 wherein the reaction mixture is injected by the respective swirl port 20 in the swirl chamber 20, is smaller than 0.9 mm$^2$ and preferably smaller than 0.6 mm$^2$. In order to reduce the risk of clogging, the smallest cross-sectional area $A_{sp}$ of each of the swirl ports 20, measured in a cross-sectional plane C perpendicular to said predetermined overall direction 21, is greater than 0.07 mm$^2$ and preferably greater than 0.08 mm$^2$. In order to be able to divide the flow or reaction mixture over a larger number of swirl ports, their smallest cross-sectional areas $A_{sp}$ are pref- 
erably smaller than 0.25 mm², more preferably smaller than 0.20 mm² and most preferably smaller than 0.15 mm².

The exit orifice 17 has a smallest cross-sectional area $A_{eo}$, measured in a transverse plane perpendicular to the longitudinal axis a of the funnel-shaped cavity, which is relatively large with respect to the sum $A_{sp,tot}$ of the cross-sectional areas $A_{sp}$ of the swirl ports 20 and which comprises in particular at least 1.3 times, preferably at least 1.5 times and more preferably at least 1.7 times the sum $A_{sp,tot}$ of the cross-sectional areas $A_{sp}$. In this way, also relatively viscous curable compositions can be effectively sprayed. In this respect, the exit orifice 17 moreover has a length $L_o$, measured in the direction of said longitudinal axis a, which is smaller than the smallest diameter $D_o$ of the exit orifice 17, measured in a plane perpendicular to said longitudinal axis a. The length $L_o$ is preferably smaller than 0.6 times, more preferably smaller than 0.5 times and most preferably even smaller than 0.4 times the smallest diameter $D_o$ of the exit orifice 17.

In the example illustrated in the figures, the exit orifice 17 is cylindrical so that the length $L_o$ and the diameter $D_o$ can easily be measured. In case of a curved transition between the swirl chamber 19 and the exit orifice 17, or between the exit orifice 17 and the outside of the nozzle, the exit orifice 17 starts, or ends, where a line tangent to the inner surface of the nozzle, and lying in a same plane as the longitudinal axis a of the funnel-shaped cavity, forms an angle smaller than 30° with this longitudinal axis a.

An essential feature of the nozzle according to a first aspect of the present invention is that the side wall 24 of the swirl chamber 19 has a surface area $A_{sc}$ which is within well-defined limits. The ratio $$\frac{A_{sc} * \cos\beta}{A_{sp,tot}}$$

is more particular smaller than or equal to 17 since it has been found that in this way a variation in the flow rate through the nozzle has a smaller effect on the size of the produced droplets. The above mentioned ratio should however be larger than or equal to 6 to be able to achieve a sufficient distribution of the reaction mixture in the swirl chamber in order to obtain a sufficient uniform spray pattern. Preferably the ratio $$\frac{A_{sc} * \cos\beta}{A_{sp,tot}}$$

is smaller than or equal to 15, more preferably smaller than or equal to 13 and most preferably smaller than or equal to 12 but larger than or equal to 7, more preferably larger than or equal to 8 and most preferably larger than or equal to 8.5.

The surface area $A_{sc}$ of the side wall 24 of the swirl chamber 19 can be increased or decreased by increasing or decreasing the height H of the swirl chamber 20, the height H being the distance between the injector piece 18 and the exit orifice 17.

In a preferred embodiment, the funnel-shaped cavity has a cross-sectional area $A_{fc}$, measured in a transverse plane B perpendicular to said longitudinal axis a and passing through the outlets of the swirl ports 20, which is such that the ratio $$\frac{A_{fc} * (\cos\beta)^2}{A_{eo}}$$

is larger than or equal to 1.7 but smaller than or equal to 6.5. When this ratio is smaller than 1.7, it will be difficult to achieve a sufficient distribution of the reaction mixture in the swirl chamber 19 or in other words a sufficiently uniform spray pattern. On the other hand, when this ratio is larger than 6.5, a less efficient atomization of the reaction mixture will usually be achieved resulting in larger droplet size variations upon changes of the flow rate through the nozzle. Preferably, the ratio $$\frac{A_{fc} * (\cos\beta)^2}{A_{eo}}$$

is smaller than or equal to 4.4, and more preferably smaller than or equal to 3.6. The ratio $$\frac{A_{fc} * (\cos\beta)^2}{A_{eo}}$$

is further preferably larger than or equal to 2.0, more preferably larger than or equal to 2.2.

EXAMPLE

Nine nozzles were made having a general construction as illustrated in FIGS. 3 to 7. The nozzles differed only in that their injector piece 18, more particularly the frustoconical portion 23 thereof, had a different height. In this way, the side walls 24 of the swirl chambers 19 had different surface areas $A_{sc}$. The inclination of the borings 25 in the injector pieces 18 was adjusted in such a manner that the swirl ports 20 of the different nozzles all had the same length.

A same polyurethane reaction mixture was sprayed with all of these nozzles both at a flow rate of 10 and 14 g/sec and the pressure drop over the nozzle was measured. Moreover, the medium volume diameter of the droplets was determined in accordance with ASTM E 799-81 and the uniformity of the spray pattern was determined by spraying the polyurethane reaction mixture onto a surface provided with a slit having a width of 5 mm and by passing the nozzle over this surface and simultaneously a paper sheet underneath this surface. The obtained results are summarized in Table 1.

TABLE 1

Droplet size and pressure variations for nozzles having a different swirl chamber sizes.

| Nozzle | $\frac{A_{sc} * \cos\beta}{A_{sp,tot}}$ | Flow rate (g/sec) | Pressure drop (bar) | MVD (μm) |
|---|---|---|---|---|
| No. 1 | 19.5 | 14 | 47.3 | 96 |
| | | 10 | 26.6 (−43%) | 158 (+65%) |
| No. 2 | 16.8 | 14 | 48.4 | 99 |
| | | 10 | 26.9 (−44%) | 146 (+47%) |
| No. 3 | 14.3 | 14 | 49.0 | 91 |
| | | 10 | 26.8 (−45%) | 126 (+38%) |
| No. 4 | 12.0 | 14 | 48.1 | 93 |
| | | 10 | 26.9 (−44%) | 122 (+31%) |
| No. 5 | 9.8 | 14 | 46.9 | 88 |
| | | 10 | 26.5 (−43%) | 117(+33%) |

TABLE 1-continued Droplet size and pressure variations for nozzles having a different swirl chamber sizes.

| Nozzle | $\dfrac{A_{sc} * \cos\beta}{A_{sp,tot}}$ | Flow rate (g/sec) | Pressure drop (bar) | MVD (μm) |
|---|---|---|---|---|
| No. 6 | 7.9 | 14 | 49.0 | 80 |
|  |  | 10 | 27.2 (−44%) | 109 (+36%) |
| No. 7 | 6.0 | 14 | 48.0 | — |
|  |  | 10 | 27.2 (−43%) | — |
| No. 8 | 4.4 | 14 | — | — |
|  |  | 10 | — | — |
| No. 9 | 3.0 | 14 | — | — |
|  |  | 10 | — | — |

The results in Table 1 show that a reduction of the size of the swirl chamber has substantially no effect on the pressure drop over the nozzle but it has surprisingly an important effect on the variation of the droplet size. As mentioned already hereabove research in the field of fuel nozzles for oil burners has shown that the median droplet size varies inversely as the 0.3 power of the pressure change. Since the pressure drop is substantially the same for all of the nine tested nozzles, one would therefore expect that the droplet size increase would also be the same, which was clearly not the case. Moreover, according to the formula found for fuel nozzles, a pressure reduction of 44% would correspond to an increase of the droplet size by about 19%, which is much smaller than the droplet size increase observed in the present example. This difference may possibly be due to the viscosity of the polyurethane reaction mixture or to the surface tension thereof. The main reason will be however most probably that the polyurethane reaction mixture is sprayed at relatively low flow rates resulting in coarser droplets. A further lowering of the flow rate will thus have a larger effect on the droplet size and hence also on the stability of the spray pattern. This has been shown in a further test with a nozzle which was identical to nozzle No. 2 except for the fact that it had somewhat deeper grooves. A decrease of the flow rate from 14 to 10 g/sec resulted in a reduction of the pressure drop over the nozzle of 47% and in a droplet size increase of 68% (from 100 to 168 μm) whereas a decrease of the flow rate from 17.5 to 12.5 g/sec resulted in a same reduction of the pressure drop over the nozzle (45%) but in a smaller droplet size increase (from 95 to 135 μm, i.e. a droplet size increase of only 42%).

Both when spraying at 14 and at 10 g/sec, the spray pattern obtained by means of nozzle No. 9 consisted mainly of four tails producing four distinctive spots on the sheet of paper. When spraying with nozzle No. 8 some further spots were produced between the four main spots. With nozzle No. 7, the spray pattern was already more uniform but nozzle No. 6 produced an even more uniform spray pattern. The most uniform spray pattern was obtained starting from nozzle No. 5. A further test was done with a nozzle having a $$\dfrac{A_{sc} * \cos\beta}{A_{sp,tot}}$$

ratio equal to 9.0, which also produced the most uniform spray pattern.

The invention claimed is:

1. A pressure swirl atomizing nozzle for spraying a curable composition onto a surface (6) to produce a polymeric layer (9) thereon, which nozzle (5) comprises:

an orifice piece (16) defining a funnel-shaped cavity and an exit orifice (17) which has a length $L_o$ and a diameter $D_o$, the funnel-shaped cavity having a longitudinal axis (a) and ending at its downstream extremity in the exit orifice (17); and an injector piece (18) closing off said funnel-shaped cavity at its upstream extremity so that the funnel-shaped cavity forms a swirl chamber (19) between a front side of the injector piece (18) and the exit orifice (17), the injector piece (18) comprising at least two swirl ports (20), each of which has an inlet and an outlet and each of which end in the swirl chamber (19) for injecting the curable composition according to a predetermined overall direction (21) into the swirl chamber (19) and for thereby imparting swirl to the curable composition;

wherein:

each of said swirl ports (20) has a smallest cross-sectional area $A_{sp}$, measured in a cross-sectional plane (C) perpendicular to said predetermined overall direction (21), the sum $A_{sp,tot}$ of the smallest cross-sectional areas $A_{sp}$ of the swirl ports (20) being smaller than 0.9 mm², preferably smaller than 0.6 mm²; wherein the swirl chamber (19) has a side wall (24) which has a surface area $A_{so}$ and which forms, in longitudinal sections through said longitudinal axis (a), an average angle $\alpha_{av}$ with a transverse plane (B) perpendicular to said longitudinal axis (a), which average angle $\alpha_{av}$ is comprised between 30 and 60°; and wherein the swirl ports (20) are oriented so that said predetermined overall directions (21), when projected at right angles onto a longitudinal plane (A) comprising said longitudinal axis (a) and being perpendicular to a straight line (b) which intersects said longitudinal axis (a) perpendicularly and which passes through the centre (c) of the outlet of the respective swirl port (20), form substantially an angle β with said transverse plane (B), the angle β being comprised between 30 and 60°;

characterised in that, the injector piece (18) is situated at such a distance (H) from the exit orifice (17) that $$6 \le \dfrac{A_{sc} * \cos\beta}{A_{sp,tot}} \le 17$$

and the ratio $L_o/D_o$ is smaller than 1.

2. A nozzle according to claim 1, characterised in that the injector niece (18) is situated at such a distance (H) from the exit orifice (17) that $$\dfrac{A_{sc} * \cos\beta}{A_{sp,tot}} \le 15,$$

preferably ≦13 and more preferably ≦12.

3. A nozzle according to claim 1, characterised in that the injector niece (18) is situated at such a distance (H) from the exit orifice (17) that $$\dfrac{A_{sc} * \cos\beta}{A_{sp,tot}} \ge 7,$$

preferably ≧8 and more preferably ≧8.5.

4. A nozzle according to claim 1, characterised in that said predetermined overall directions (21), when projected at right angles onto a further longitudinal plane (D) comprising said longitudinal axis (a) and a straight line (e) which intersects said longitudinal axis (a) perpendicularly and which passes through the centre (c) of the outlet of the respective swirl port (20), form an angle (γ) with said transverse plane (B) which is at least 8°, preferably at least 12° larger than said average angle $\alpha_{av}$.

5. A nozzle according to claim 4, characterised in that the swirl ports (20) are oriented so that said projections of said predetermined overall directions (21) onto said further longitudinal planes (D) form an angle (γ) with said transverse plane (B) which is at least 8°, preferably at least 12° larger than said average angle $\alpha_{av}$.

6. A nozzle according to claim 1, characterised in that the swirl ports (20) are formed by grooves in the injector piece (18).

7. A nozzle according to claim 6, characterised in that the grooves (20) have a depth which decreases from their inlet to their outlet.

8. A nozzle according to claim 6, characterised in that the inlets of the swirl ports (20) are in fluid communication with a back side of the injector piece (18) by borings (25) in the injector piece (18).

9. A nozzle according to claim 1, characterised in that at their outlets, the swirl ports (20) have a width (w), measured in a transverse plane (B) perpendicular to said longitudinal axis (a), in a direction tangent to the outer circumference of the front side of the injector piece (18), the sum of the widths (w) of the swirl ports (20) being at least 11% of the outer circumference of the front side of the injector piece (18).

10. A nozzle according to claim 9, characterised in that the sum of the widths (w) of the swirl ports (20) is at least 14%, preferably at least 17% of said outer circumference.

11. A nozzle according to claim 1, characterised in that the smallest cross-sectional area $A_{sp}$ of each of said swirl ports (20), measured in a cross-sectional plane (C) perpendicular to said predetermined overall direction (21), is greater than 0.07 mm², preferably greater than 0.08 mm², but smaller than 0.25 mm², preferably smaller than 0.20 mm² and more preferably smaller than 0.15 mm².

12. A nozzle according to claim 1, characterised in that measured in a transverse plane (B) perpendicular to said longitudinal axis (a) and passing through the outlets of the swirl ports (20), the funnel-shaped cavity has a cross-sectional area $A_{fc}$ and the exit orifice (17) has a smallest cross-sectional area $A_{eo}$ so that $$1.7 \leq \frac{A_{fc} * (\cos\beta)^2}{A_{eo}} \leq 6.5.$$

13. A nozzle according to claim 12, characterised in that $$\frac{A_{fc} * (\cos\beta)^2}{A_{eo}} \leq 4.4,$$

preferably $\leq 3.6$.

14. A nozzle according to claim 12, characterised in that $$\frac{A_{fc} * (\cos\beta)^2}{A_{eo}} \geq 2.0,$$

preferably $\geq 2.2$.

15. A nozzle according to claim 1, characterised in that the ratio $L_o/D_o$ is smaller than 0.6, preferably smaller than 0.5 and more preferably smaller than 0.4.

16. A nozzle according to claim 1, characterised in that the exit orifice (17) has a smallest cross-sectional area $A_{eo}$, $A_{eo}$ being $\geq 1.3*A_{sp,tot}$, preferably $\geq 1.5*A_{sp,tot}$ and more preferably $\geq 1.7*A_{sp,tot}$.

17. A method for producing a polymeric layer (9) on a surface (6), the method comprising the step of spraying a curable composition onto the surface by a pressure swirl atomizing nozzle according to claim 1.

18. A method according to claim 17, characterised in that the curable composition contains at the most 10% by weight of solvents, preferably at the most 5% by weight of solvents, and is preferably substantially free of solvents.

19. A method according to claim 17, characterised in that said curable composition is a polyurethane reaction mixture, in particular a mixture of at least a polyol component and an isocyanate component.

20. A method according to claim 17, characterised in that the curable composition is sprayed out of the nozzle (5) in the form of droplets (8) having a medium volume diameter, determined according to ASTM E 799-81, larger than 50 µm, preferably larger than 60 µm, more preferably larger than 70 µm and most preferably larger than 80 µm, or in the form of a film (7) which falls apart into such droplets (8) at a distance (d) from the nozzle (5).

21. A method according to claim 20, characterised in that both when spraying at said highest and at said lowest flow rate, the medium volume diameter of the droplets (8) is within the ranges determined according to ASTM E 799-81, larger than 50 µm, preferably larger than 60 µm, more preferably larger than 70 µm and most preferably larger than 80 µm, and smaller than 500 µm, preferably smaller than 300 µm, more preferably smaller than 200 µm and most preferably smaller than 150 µm.

22. A method according to claim 17, characterised in that the curable composition is sprayed out of the nozzle (5) in the form of droplets (8) having a medium volume diameter, determined according to ASTM E 799-81, smaller than 500 µm, preferably smaller than 300 µm, more preferably smaller than 200 µm and most preferably smaller than 150 µm, or in the form of a film (7) which falls apart into such droplets (8) at a distance (d) from the nozzle (5).

23. A method according to claim 17, characterised in that when spraying the curable composition onto the surface (6), the flow rate of the curable composition is varied, the ratio between the highest and the lowest flow rate being $\geq 1.1$, in particular $\geq 1.2$ and more particularly $\geq 1.3$.

24. A method according to claim 17, characterised in that when spraying the curable composition onto the surface (6), the flow rate of the curable composition is varied, the curable composition being composed by mixing at least two components in a predetermined ratio, which predetermined ratio is maintained also during the transition from one flow rate to another flow rate.

25. A pressure swirl atomizing nozzle for spraying a curable composition onto a surface (6) to produce a polymeric layer (9) thereon, which nozzle (5) comprises:

an orifice piece (16) defining a funnel-shaped cavity and an exit orifice (17) which has a length $L_o$ and a diameter $D_o$, the funnel-shaped cavity having a longitudinal axis (a) and ending at its downstream extremity in the exit orifice (17); and an injector piece (18) closing off said funnel-shaped cavity at its upstream extremity so that the funnel-shaped cavity forms a swirl chamber (19) between a front side of the injector piece (18) and the exit orifice (17), the injector piece (18) comprising at least two swirl ports (20), each of which has an inlet and an outlet and each of which end in the swirl chamber (19) for injecting the curable composition according to a predetermined overall direction (21) into the swirl chamber (19) and for thereby imparting swirl to the curable composition;

wherein:

each of said swirl ports (20) has a smallest cross-sectional area $A_{sp}$, measured in a cross-sectional plane (C) perpendicular to said predetermined overall direction (21), the sum $A_{sp,tot}$ of the smallest cross-sectional areas $A_{sp}$ of the swirl ports (20) being smaller than 0.9 mm$^2$, preferably smaller than 0.6 mm$^2$; wherein the swirl chamber (19) has a side wall (24) which has a surface area $A_{sc}$ and which forms, in longitudinal sections through said longitudinal axis (a), an average angle $\alpha_{av}$ with a transverse plane (B) perpendicular to said longitudinal axis (a), which average angle $\alpha_{av}$ is comprised between 30 and 60°; and wherein the swirl ports (20) are oriented so that said predetermined overall directions (21), when projected at right angles onto a longitudinal plane (A) comprising said longitudinal axis (a) and being perpendicular to a straight line (b) which intersects said longitudinal axis (a) perpendicularly and which passes through the centre (c) of the outlet of the respective swirl port (20), form substantially an angle β with said transverse plane (B), the angle β being comprised between 30 and 60°;

characterised in that, the ratio $L_o/D_o$ is smaller than 1 and said predetermined overall directions (21), when projected at right angles onto a further longitudinal plane (D) comprising said longitudinal axis (a) and a straight line (e) which intersects said longitudinal axis (a) perpendicularly and which passes through the centre (c) of the outlet of the respective swirl port (20), form an angle (γ) with said transverse plane (B) which is at least 8°, preferably at least 12° larger than said average angle $\alpha_{av}$.

* * * * *